United States Patent [19]

Hopkins

[11] Patent Number: 4,461,090
[45] Date of Patent: Jul. 24, 1984

[54] HEADLAMP ADJUSTER

[75] Inventor: Evan L. Hopkins, Emporia, Kans.

[73] Assignee: Hopkins Manufacturing Corporation, Emporia, Kans.

[21] Appl. No.: 376,274

[22] Filed: May 10, 1982

[51] Int. Cl.³ .............................................. G01B 5/24
[52] U.S. Cl. ...................................... 33/335; 33/376; 33/386; 33/451; 33/381
[58] Field of Search ................. 33/335, 288, 451, 379, 33/386, 370, 371, 372, 381, 385, 383, 390, 382, 375

[56] References Cited

U.S. PATENT DOCUMENTS

| 1,227,528 | 5/1917 | Chidley. | |
| 1,683,509 | 9/1928 | Wescott | 33/451 |
| 1,963,805 | 6/1934 | Radke et al. | 33/376 X |
| 2,767,480 | 10/1956 | Hearn | 33/180 |
| 2,811,783 | 11/1957 | Neely, Jr. | 33/180 |
| 2,831,262 | 4/1958 | Falge et al. | 33/335 |
| 2,887,779 | 5/1959 | Hearn | 33/180 |
| 2,913,824 | 11/1959 | Drennan | 33/46 |
| 2,913,825 | 11/1959 | MacMillan. | |
| 3,522,657 | 8/1970 | Metrulis | 33/451 |

FOREIGN PATENT DOCUMENTS

| 827831 | 2/1938 | France | 33/386 |
| 1389511 | 1/1965 | France | 33/379 |

Primary Examiner—William D. Martin, Jr.
Attorney, Agent, or Firm—Lahive & Cockfield

[57] ABSTRACT

A vehicle headlamp adjuster has an expandable plate with pads for contacting a roadway surface and then a vehicle headlamp. A level indicator has perpendicular, communicating spirit levels and is rotatable about an axis parallel to the plate, to set one spirit level when the pads contact the surface on which the vehicle rests, so that the other spirit level will indicate horizontal when the plate and pads are rotated 90° and brought to bear on the vehicle headlamps.

6 Claims, 7 Drawing Figures

HEADLAMP ADJUSTER

This invention relates generally to vehicle headlamp adjusters and particularly to adjusters for adjusting the vertical orientation of headlamps of a vehicle regardless of the slope of the surface on which the vehicle is resting.

BACKGROUND OF THE INVENTION

Headlamps on vehicles are typically mounted so that they may be adjusted in both their vertical and horizontal orientation. They should be precisely oriented so that the beams of light from the headlamps will be used most safely and effectively. One way to test the orientation of headlamps is to shine the headlamps onto a wall in front of the vehicle and check the light pattern on the wall against some standard. The headlamps may then be adjusted until the standard is achieved. Another way is to check the true horizontal and vertical inclination of the headlamp front surface, since the headlamps are ordinarily made so that, for example, true vertical orientation of the headlamp front glass surface will correspond to a proper vertical orientation for the resulting light beam.

Accordingly, a number of devices have been devised that allow one to check the true vertical orientation of a vehicle headlamp by simply applying the device to the headlamp. Some of these devices have elements to compensate for a slope in the surface on which the vehicle is resting. Obviously, orienting a headlamp to a true vertical while the vehicle is on a slope would mean the headlamp was not truly vertical when the vehicle was truly horizontal, unless compensation for the slope was made. The devices have differing arrangements for checking the vertical orientation of the headlamps and for compensating for floor slope.

It is an object of this invention to provide an improved headlamp adjuster that compensates for floor slope, that is compact and easy to use, and that is inexpensive to manufacture and assemble.

SUMMARY OF THE INVENTION

The invention comprises a single surface contact means for contacting first the surface on which a vehicle is resting and then the surface of the vehicle headlamp, and level indicating means adjustably mounted on the surface contact means. The level indication means comprises a first level indicating means for indicating a horizontal level position when the single surface contact means is contacting the surface, a second level indicating means for indicating a horizontal level position when the single surface contact means is perpendicular to the surface, and means for adjusting the level indication means relative to the single surface contact means.

Preferably, the single surface contact means is adjustable in dimensions parallel to the plane defined by the surface contact means and a frame means is fixed to the surface contact means, the level indicating means being mounted on the frame means and arranged to be rotatable about an axis parallel to the plane. The first and second level indicating means are tubular spirit level means containing liquid, in communication with each other and perpendicular to each other. The adjusting means comprises cam shaft means rotatably mounted on the frame means, the level indication means defining a camming surface bearing on the cam shaft means and arranged so that rotation of the cam shaft means causes rotation of the level indication means about the axis.

BRIEF DESCRIPTION OF THE DRAWING

Other objects, features and advantages of the invention will be apparent from the following description of a preferred embodiment of the invention including the drawings thereof, in which.

DESCRIPTION OF A PREFERRED EMBODIMENT

Figure 1:
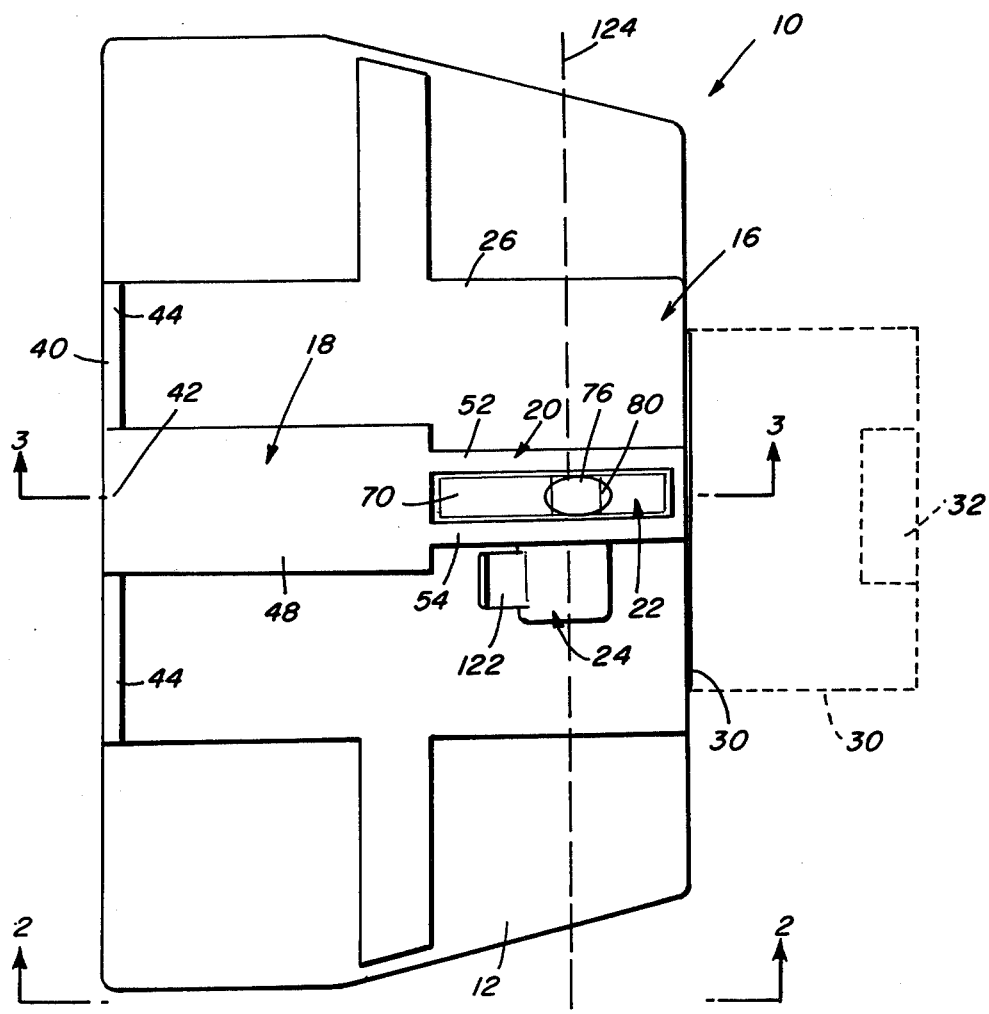
FIG. 1 is a plan view of a headlamp adjuster according to the invention.
Figure 2:
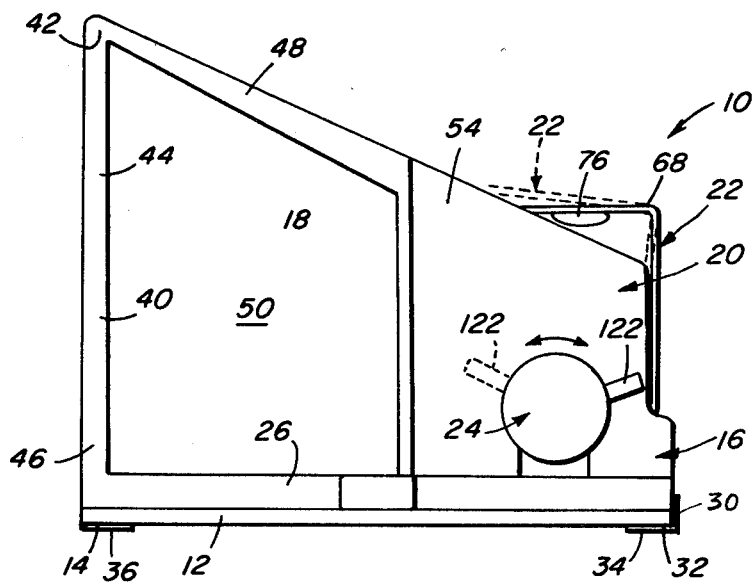
FIG. 2 is a side elevation of the adjuster shown in FIG. 1.
Figure 6:
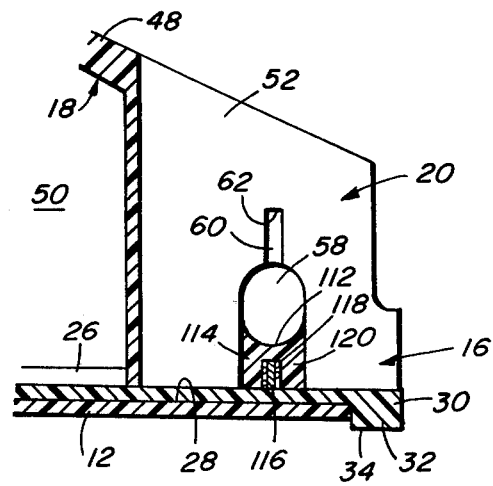
FIG. 6 is a sectional view like that of FIG. 3, with the level indicating unit and the cam shaft removed.
Figure 3:
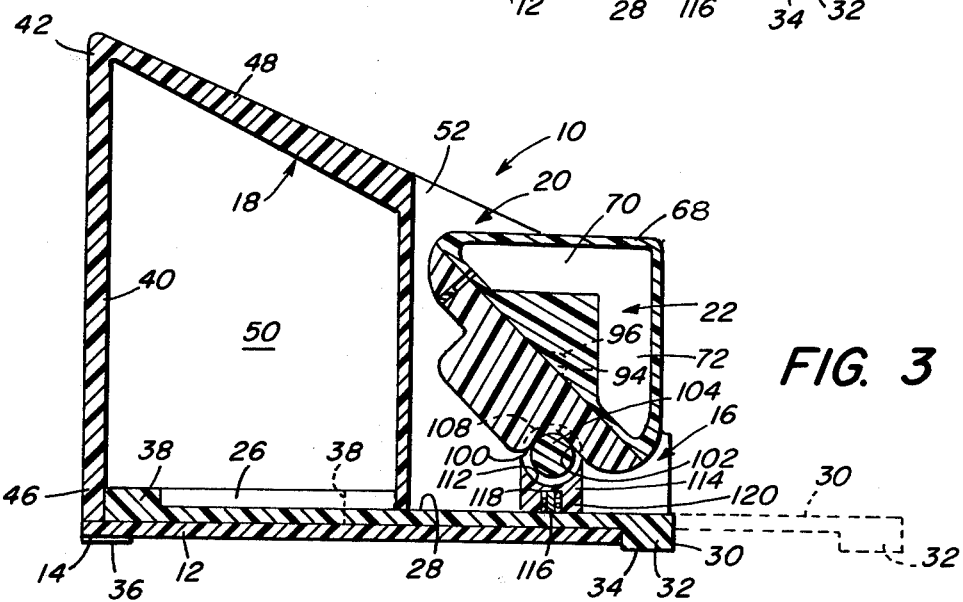
FIG. 3 is a sectional view of the adjuster, along the line 3—3 of FIG. 1.

As shown in the drawings, the headlamp adjuster 10 has a bottom plate 12 with bottom pads 14 at either rear corner. The bottom plate 12 is fixed, by some conventional adhesive, to an upper adjuster body 16 that includes a handle 18, and a mounting assembly 20 for a level indicating unit 22 adjustable by an adjusting knob 24. (See FIGS. 1, 2 and 3.) The frame bottom 26 has a bottom recess 28 in which an extension plate 30 is slidably inserted, the plate 30 having a front central bottom pad 32 whose lower surface 34 is co-planar with the lower surface 36 of the pads 14 of the bottom plate 12. The extension plate 30 may be extended out of the recess 28 to a limit determined by an upper tab 38 at the rear of the extension plate 30, which butts up against the level indicating unit mounting assembly 20 when the plate 30 is pulled out. The dashed line outlines of the extension plate 30 in FIGS. 1 and 3 show the outer limit of movement of the plate 30 and its pad 32. Unless otherwise noted, all the parts of the adjuster 10 are molded plastic.

The handle 18 of the adjuster body 16 is formed from an upstanding back member 40 that is narrow at the top 42 with side walls 44 flaring out near the bottom 46, and an upper diagonal member 48 that extends from the back member 40 to the level indicating unit mounting assembly 20, defining an open section 50 through which the fingers may extend when the handle 18 is grasped. The mounting assembly 20 includes two spaced apart vertical walls 52, 54 between which the level indicating unit 22 is rotatably mounted. The walls 52, 54 have aligned holes 56, 58 through the walls, and each wall has a groove 60 in the inside of the walls 52, 54, extending upwardly from the holes 56, 58 and ending in rounded surface 62.

Figure 4:
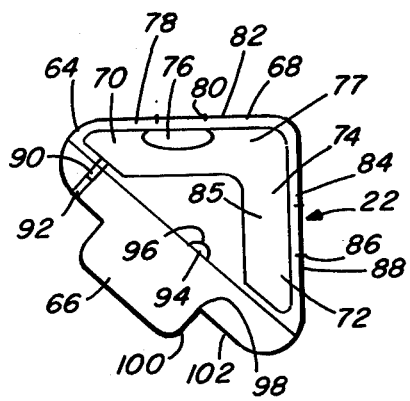
FIG. 4 is a side elevation of the level indicating unit of the adjuster.

The level indicating unit 22 is shown in FIG. 4. The unit 22 includes a spirit level portion 64 and a base 66. The spirit level portion 64 has a body 68 forming two internal tubular cavities 70, 72. The tubular cavities 70, 72 are connected and arranged to be perpendicular to each other. A fluid 74 fills the communicating cavities 70, 72 except for space for a bubble 76 to exist. Each tubular cavity 70, 72 is essentially straight with a slight outward curve at the center 78, 80 of each to form, in the conventional manner, spirit levels.

The first tubular cavity 70 forms a horizontal level indicatior 77 when the cavity 70 is generally horizontal, the exact horizontal position being determined when the bubble 76 is at the center 78 of the tubular cavity 70, between indicator marks 80 scored on the surface 82 of the unit 22. The second tubular cavity 72 forms a plumb-vial, or vertical line indicator 84, when the cavity 72 is generally horizontal, the exact vertical position being determined when the bubble 76 is at the center 85 of the tubular cavity 72, between indicator marks 86 scored on the surface 88 of the unit 22.

The level indicating unit base 66 is adhered to the spirit level portion 64 by a conventional adhesive. The base 66 and spirit level portion 64 include an injection port 90 for injecting fluid 74 into the tubular cavities 70, 72. A plug 92 closes off the port 90 after the injection is completed. On either side of the unit 22 there extends outwardly a semicircular pin 94, with a rounded surface 96 conforming to the rounded surface 62 at the end of the grooves 60 in the mounting assembly walls, 52, 54. The base 66 includes a generally right angled corner 98 with perpendicular surfaces 100, 102 which will act as camming surfaces responsive to a cam shaft 104 extending from the adjusting knob 24 when the unit 22 is in the adjuster mounting assembly 20.

Figure 5:
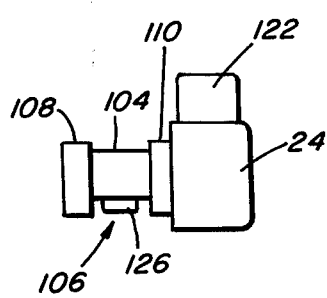
FIG. 5 is a side elevation of the adjusting cam shaft of the adjuster.

The cam shaft 104 is an off-center portion of the adjustment element 106 (see FIG. 5) extending from the adjusting knob 24. The adjusting element 106 extends through the holes 56, 58 of the vertical walls 52, 54 of the level indicating unit mounting assembly 20. Two cylindrical bearing surfaces 108, 110 are formed on the element 106 to rest on the cylindrical surface 112 of a support block 114 under the element 106. The support block 114 rests on the extension plate 30 and is biased upwardly by a spring loaded pin 116 residing in a recess 118 in the base 120 of the block 114. An adjusting tab 122 extends from the adjusting knob 24 to make rotation of the knob 24 easier. The effect of rotation of the knob 24 (see FIG. 2) is to rotate the level indicating unit 22 about the pivot point of the unit's pins 94 as the cam shaft 104 bears on the unit's camming surfaces 100, 102. The dashed line drawings of the knob's adjusting tab 122 and the outline of the level indicating unit 22 in FIG. 2 illustrate the movement of those two elements. In effect, the level indicating element 22 is rotatably movable about an axis 124 parallel to the plane formed by the bottom surfaces 34, 36 of the adjuster pads 14 and 32. The axis 124 is also parallel to the axis about which the adjuster 10 would be rotated 90° to put the adjuster pads 14, 32 against a headlamp. A small tab 126 extending from the cam shaft 104 prevents complete rotation of the cam shaft 104, limiting movement to an arc defined by the extreme positions of the adjusting knob tab 122 shown in FIG. 2.

In use the adjuster 10 is first adjusted to compensate for the slope of the ground on which the vehicle rests. Preferably, the vehicle is parked on a flat paved surface. The extension plate 30 is fully extended and the adjuster 10 is placed with its pads 14, 32 down on the surface next to the front wheel of the vehicle with the extension pad 32 closest to the rear of the vehicle. The adjustment knob 24 is then turned until the bubble 76 in the horizontal level indicator portion 78 of the level indicating unit 20 is centered between the indicator marks 80.

Then the adjuster 10 is turned 90° so that the bottom plate 12 is vertical and the pads 14, 32 face the headlamp to be adjusted. If the headlamp is one of modern design, it will have aim pads, or beads, on the front glass surface of the headlamps. The pads 14, 32 of the bottom plate 12 and the extension plate 30 are placed over these headlight aim pads, the extension plate 30 being slid in or out of the recess 28 to the extent necessary to have the extension pad 32 match the aiming pad on smaller or larger headlamps respectively. The vertical adjustment screw or mechanism of the headlamp is then turned until the bubble 76 is centered between the indicator marks 86 of the vertical line indicator 84. The headlamp would then be precisely perpendicular to the surface on which the vehicle is resting, regardless of the slope of the surface.

Figure 7:
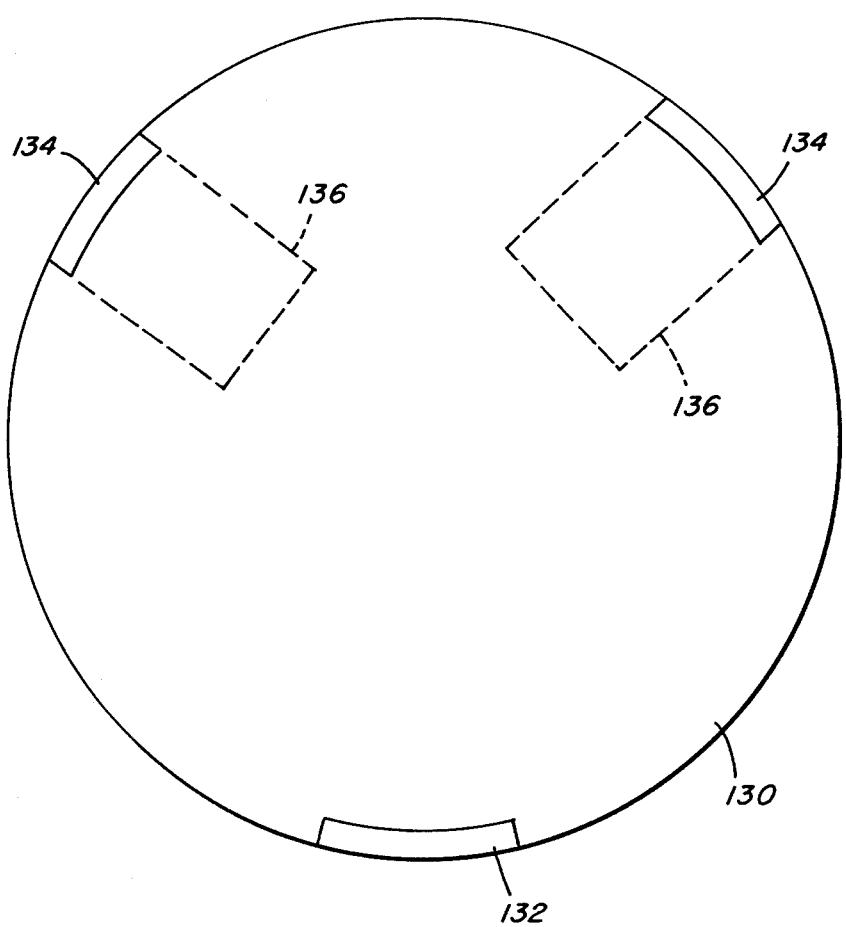
FIG. 7 is a bottom view of another embodiment of the headlamp adjuster, suitable for circular headlamps.

The adjuster 10 shown is suitable for modern flat rectangular headlamps. FIG. 7 shows an alternative bottom plate 130 suitable for circular headlamps that may in addition have curved surfaces. A fixed pad 132 extends from the bottom of the plate 130 and other pads 134 extend from movable elements 136 that may be extended radially outwardly to adjust for larger headlamps.

ADVANTAGES OF THE INVENTION

The invention provides a handy and simple to use tool for aiming headlights. The function of the right angle level indicating unit is easy to see and comprehend. The single surface for aligning with the ground surface and with the headlamp surface eliminates confusion about operation of the device. The cam shaft and adjusting knob arrangement provide a handy adjusting mechanism for the device that is easy to use. Assembly of the device from its constituent parts is easy.

Variations of the illustrated embodiment such as providing different surface contacting portions for different kinds of headlamps are possible. Other variations may occur to those skilled in the art and come within the spirit and scope of the invention as set forth in the following claims:

I claim:

1. A vehicle headlamp adjuster for adjusting the vertical orientation of said headlamps in a vehicle resting on a surface, comprising:
    single surface contact means for contacting first said surface on which said vehicle rests, and then said vehicle headlamps,
        said surface contact means including headlamp contacting means for contacting said headlamp so that when said surface contact means is pressed against said headlamp, said surface contact means is parallel to said headlamp,
    level indication means adjustably mounted on said single surface contact means comprising:
        first level indicating means for indicating a horizontal level position when said single surface contact means is contacting said surface,
        second level indicating means for indicating a horizontal level position when said single surface contact means is perpendicular to said surface, and
        means for adjusting said level indication means relative to said single surface contact means.

2. A vehicle headlamp adjuster for adjusting the vertical orientation of said headlamps in a vehicle resting on a surface, comprising
    surface contact means generally defining a plane,
        said surface contact means including headlamp contacting means for contacting said headlamp so that when said surface contact means is pressed against said headlamp, said surface contact means is parallel to said headlamp, frame means fixed to said surface contact means, level indication means mounted on said frame means and arranged to be rotatable about an axis parallel to said plane, comprising:

a first level indicator for indicating a level position when said surface contact means is contacting said surface on which said vehicle rests, and a second level indicator for indicating a level position when said surface contact means is perpendicular to said surface, said first and second level indicators being fixed perpendicularly to each other, and means for adjusting the relative position of said level indicating means about said axis.

3. The vehicle headlamp adjuster of claim 2 wherein said level indication means comprises:

said first level indicator comprising first tubular spirit level means containing liquid and said second level indicator comprising second tubular spirit level means containing liquid.

4. The vehicle headlamp adjuster of claim 3 wherein said first and second tubular spirit means are arranged to be connected so that liquid passes between said first and second tubular spirit level means.

5. The vehicle headlamp adjuster of claim 2 wherein said adjusting means comprises cam shaft means rotatably mounted on said frame means, and said level indication means defines a camming surface bearing on said cam shaft means and arranged so that rotation of said cam shaft means causes rotation of said level indication means about said axis.

6. A vehicle headlamp adjuster for adjusting the vertical orientation of said headlamps in a vehicle resting on a surface, comprising:

surface contact means generally defining a plane, said surface contact means being adjustable in dimensions parallel to said plane, said surface contact means including headlamp contacting means for contacting said headlamp so that when said surface contact means is pressed against said headlamp, said surface contact means is parallel to said headlamp, frame means fixed to said surface contact means, level indicating means mounted on said frame means and arranged to be rotatable about an axis parallel to said plane, comprising:

a first level indicator comprising first tubular spirit level means containing liquid, for indicating a level position when said surface contact means is contacting the surface on which said vehicle rests, a second level indicator comprising a second tubular spirit level means containing liquid, said second tubular spirit level means in liquid communication with said first tubular spirit level means, for indicating a level position when said surface contact means is perpendicular to said surface, said first and second level indicators being fixed perpendicularly to each other, and means for adjusting the relative position of said level indicating means about said axis, said adjusting means comprising cam shaft means rotatably mounted on said frame means, and said level indicating means defining a camming surface bearing on said cam shaft means and arranged so that rotation of said cam shaft means causes rotation of said level indicating means about said axis.

* * * * *